United States Patent
Baughman et al.

(10) Patent No.: US 10,531,209 B1
(45) Date of Patent: Jan. 7, 2020

(54) RESIDUAL SYNCING OF SOUND WITH LIGHT TO PRODUCE A STARTER SOUND AT LIVE AND LATENT EVENTS

(71) Applicant: International Business Machines Corporation, Armonk, NY (US)

(72) Inventors: Aaron K. Baughman, Silver Spring, MD (US); Garfield Vaughn, South Windsor, CT (US); Micah Forster, Austin, TX (US); Paul A. R. Frank, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/103,388

(22) Filed: Aug. 14, 2018

(51) Int. Cl.
*H04R 27/00* (2006.01)
*G10L 21/12* (2013.01)
*H04R 3/00* (2006.01)
*G06N 3/02* (2006.01)

(52) U.S. Cl.
CPC ............. *H04R 27/00* (2013.01); *G06N 3/02* (2013.01); *G10L 21/12* (2013.01); *H04R 3/002* (2013.01)

(58) Field of Classification Search
CPC .......... H04R 27/00; H04R 3/002; G06N 3/02; G10L 21/12
See application file for complete search history.

(56) References Cited

U.S. PATENT DOCUMENTS

| 2008/0318518 A1 | 12/2008 | Coutinho et al. |
| 2012/0200774 A1 | 8/2012 | Ehlers |
| 2015/0012123 A1 | 1/2015 | Irmler |
| 2016/0050508 A1 | 2/2016 | Redmann |
| 2016/0286282 A1 | 9/2016 | Marck |

FOREIGN PATENT DOCUMENTS

| CN | 1402952 A | 3/2003 |
| JP | 2001036900 A | 2/2001 |

OTHER PUBLICATIONS

Shrestha et al., "Automatic Mashup Generation from Multiple-camera Concert Recordings," Proceedings of the International Conference on Multimedia, Oct. 25-29, 2010, Firenze, Italy, pp. 541-550.

Light, "Transports of Delight? What the Experience of Receiving (Mobile) Phone Calls Can Tell Us About Design," Personal and Ubiquitous Computing, 2008, vol. 12, Issue 5, pp. 291-400.

(Continued)

*Primary Examiner* — Regina N Holder
(74) *Attorney, Agent, or Firm* — Yee & Associates, P.C.

(57) ABSTRACT

Systems, methods, and devices for synchronizing sound with light to produce a starter sound for reducing a listener's perceived gap between reception of an action image produced by an action at a distance from a listener and an action sound produced by the action. In an embodiment, a method includes predicting when a distant action will occur to produce a predicted action time. The method also includes generating a starter sound from a sound generation location near the listener. The starter sound is generated according to the predicted action time and according to the distant action. The starter sound is generated at a time such that the starter sound arrives at a listener's location at or after the action image arrives at the listener's location and prior to arrival of the action sound produced by the action.

20 Claims, 6 Drawing Sheets

(56) References Cited

OTHER PUBLICATIONS

Bondarev et al., "CARAT: a Toolkit for Design and Performance Analysis of Component-Based Embedded Systems", Design Automation and Test in Europe Conference & Exhibition, Apr. 16-20, 2007, Nice, France, pp. 1-6.
Khan et al., "Enhanced Audio-visual Warnings for Reducing Bird Fatalities at Wind Turbines," 3rd International Conference on Green Energy and Technology (ICGET), 2015, Dhaka, Bangladesh, pp. 1-6.
Zhou et al., "Simulation Approach of Display Uniformity in a Backlight Illuminated Lens Array," Progress in Electromagnetic Research Symposium (PIERS), Aug. 8-11, 2016, Shanghai, China, pp. 3393-3401.
Kotus et al., "Gaze-tracking and Acoustic Vector Sensors Technologies for PTZ Camera Steering and Acoustic Event Detection," Workshops on Database and Expert Systems Applications, Bilbao, Spain, 2010, pp. 276-280.

RESIDUAL SYNCING OF SOUND WITH LIGHT TO PRODUCE A STARTER SOUND AT LIVE AND LATENT EVENTS

BACKGROUND

1. Field

The disclosure relates generally to synchronizing sound and light and more specifically to systems and methods to improve an audience member's experience of an event.

2. Description of the Related Art

Large events such as conferences, sporting venues, celebrations, and the like typically have a wide range of viewing areas to accommodate a large crowd. The distance between an audience member and the place of action can have a profound impact on the overall experience. For example, a person could visually see a firework in the distance yet hear the explosion after the event occurred, often times, significantly later than the occurrence of the event. The distance viewing is reinforced by the different arrival times of light and sound. Sound travels at a velocity of 343 meters per second while light moves at $3*10^8$ meters per second. The difference in speed means that the modal experience stimulates the human senses at different times. This difference in perceiving the sound and the image at different times diminishes the enjoyment of the event by the audience member.

Therefore, it would be desirable to have a method and apparatus that take into account at least some of the issues discussed above, as well as other possible issues. For example, it would be desirable to have a method and apparatus that overcome a technical problem with the experience of an event by an audience member that is adversely affected by the disparity between hearing and seeing an action at an event by a person significantly distant from the occurrence of the action.

SUMMARY

According to one embodiment of the present invention, a method for reducing a listener's perceived gap between reception of an action image produced by an action at a distance from a listener and an action sound produced by the action includes predicting when a distant action will occur to produce a predicted action time. The method also includes generating a starter sound from a sound generation location near the listener. The starter sound is generated according to the predicted action time and according to the distant action. The starter sound is generated at a time such that the starter sound arrives at a listener's location at or after the action image arrives at the listener's location. The starter sound is generated at the time such that the starter sound arrives at the listener's location prior to arrival of the action sound produced by the action. The starter sound is designed such that the listener perceives the action sound as having arrived at a same time as the arrival of the action image.

According to one embodiment of the present invention, a starter sound system for synchronizing an action sound and an action image includes a computer system and one or more processors running on the computer system. The one or more processors predict when a distant action will occur to produce a predicted action time. The one or more processors generate a starter sound from a sound generation location near the listener. The starter sound is generated according to the predicted action time and according to the distant action. The starter sound is generated at a time such that the starter sound arrives at a listener's location at or after the action image arrives at the listener's location. The starter sound is generated at the time such that the starter sound arrives at the listener's location prior to arrival of the action sound produced by the action. The starter sound is designed such that the listener perceives the action sound as having arrived at a same time as the arrival of the action image.

According to one embodiment of the present invention, a computer program product for generating a starter sound for reducing a listener's perceived gap between reception of an action image, produced by an action at a distance from a listener, and an action sound, produced by the action, includes a persistent computer-readable storage media. The computer program product also includes a first program code, stored on the computer-readable storage media, for predicting when a distant action will occur to produce a predicted action time. The computer program product also includes a second program code, stored on the computer-readable storage media, for generating a starter sound from a sound generation location near the listener. The starter sound is generated according to the predicted action time and according to the distant action. The starter sound is generated at a time such that the starter sound arrives at a listener's location at or after the action image arrives at the listener's location. The starter sound is generated at the time such that the starter sound arrives at the listener's location prior to arrival of the action sound produced by the action. The starter sound is designed such that the listener perceives the action sound as having arrived at a same time as the arrival of the action image.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
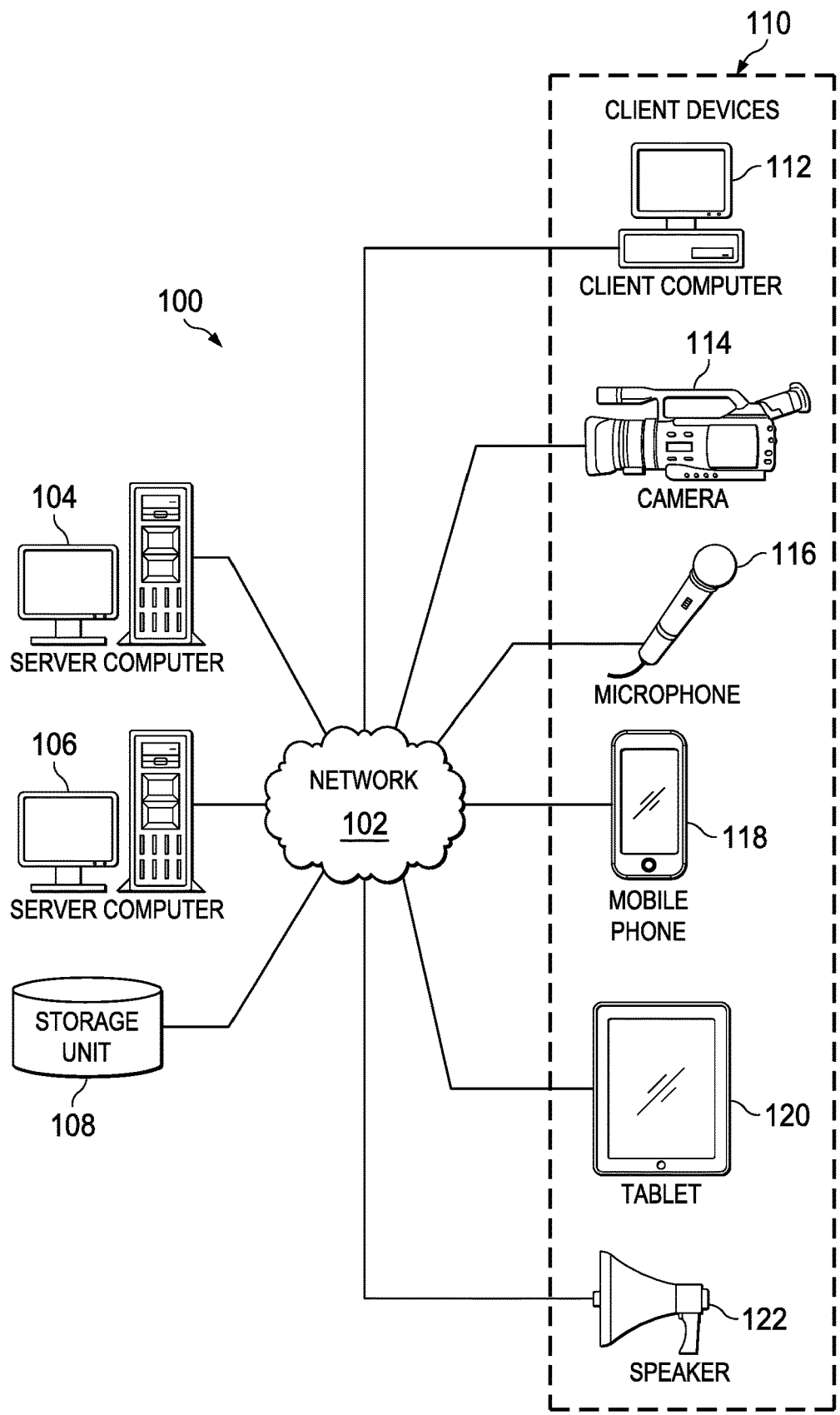
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Large events such as conferences, sporting venues, celebrations, etc. typically have a wide range of viewing areas to accommodate a large crowd. The distance between an audience member and the action can have a profound impact on the overall experience. For example, a person could visually see a firework in the distance yet hear the explosion after the event occurred. The distance viewing is reinforced by the different arrival times of light and sound. Sound travels at a velocity of around 343 meters per second while light moves at a speed of around $3*10^8$ meters per second.

The difference in speed means that the modal experience stimulates the human senses at different times.

A single action that happens which produces sound and light waves may stimulate the human senses at different times based on the distance between the human and the action (or between the recording device and the action). The person within the experience has less immersion within the action the further they are away from the action.

Disclosed herein are systems, methods, and apparatuses that provide a higher amount of immersion for each person at differing distances from the action. In an embodiment, a starter sound play time and phase shift is calculated to account for light and sound speed and for the Doppler effect. A system of cameras or video is coupled together with microphones to align the light and sound signals. The starter sound is then played just before the actual sound arrives to stimulate an aural response in the human. Thus, in an embodiment, an audience member is immersed within an event from any distance. A specific action can be moving and the starter sound matches the action. The sound and light stimulate the human senses at the same time thereby improving the user's experience.

In an embodiment, a camera and a high sensitive microphone are placed in separate locations at an event. In an embodiment, the light image is rotated using, for example, the law of cosines, such that the light image matches the sound so that a deep learning determination of the phase shift and starter sound play is coherent.

In an embodiment, a series of raster images, such as a series of Joint Photographic Experts Group (JPEG) formatted images, are taken as a sequence. The sound corresponding to the images is also recorded. The sound is converted into a spectrogram at each of the series of the images. In an embodiment, the images from the video are in three channels (red, green, and blue) while the spectrogram of the sound is also within three channels (red, green, and blue or in grayscale). The images are concatenated together and fed through a convolutional neural network (CNN). The deep connected portion of the neural network is input into a Long Short Term Memory (LSTM) node. As a result, the CNN correlates the feature discovery process between sound and light while the LSTM finds patterns across the time samples. The output of the system is a phase shift (that accounts for action movement) and a starter sound play "speed up". The output of the CNN's feature vector is saved within a database of starter sounds. When a similar event occurs, the same sound as the previous similar action is dampened and smoothed with convolution and played during the speed up time. The playing of the starter sound stops when the actual sound arrives.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112. Client devices 110 may be, for example, computers, workstations, or network computers. In the depicted example, server computer 104 provides information, such as boot files, operating system images, and applications to client devices 110. Further, client devices 110 can also include other types of client devices such as camera 114, microphone 116, mobile phone 118, tablet computer 120, and speaker 122. In this illustrative example, server computer 104, server computer 106, storage unit 108, and client devices 110 are network devices that connect to network 102 in which network 102 is the communications media for these network devices. Some or all of client devices 110 may form an Internet of things (IOT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
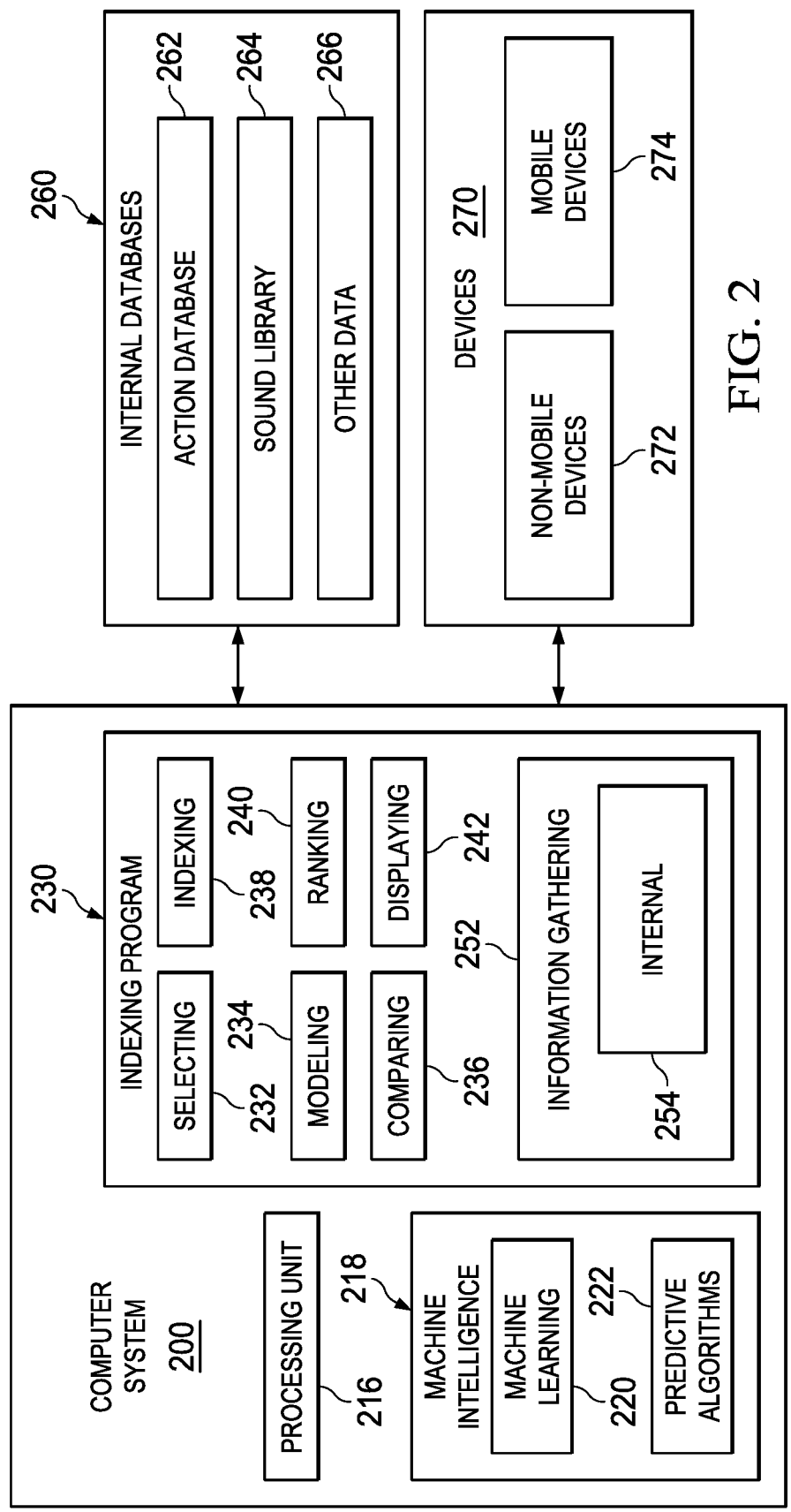
FIG. 2 is a block diagram of a computer system for predictive modeling in accordance with an illustrative embodiment.

Turning to FIG. 2, a block diagram of a computer system for determining and playing a starter sound is depicted in accordance with an illustrative embodiment. Computer system 200 is connected to internal databases 260 and devices 270. Internal databases 260 include an action database 262, a sound library 264, and other data 266. The action database 262 includes a library of action types that have been observed by the computer system 200 and a sound library 264 of starter sounds that have been determined for each of the action types. Devices 270 comprise non-mobile devices 272 and mobile devices 274. The non-mobile devices 272 and the mobile devices 274 may include cameras, microphones, displays, and speakers. The sound library 264 includes starter sounds associated with actions in the action database 262 determined by the computer system 200 from observing actions and sounds. Once determined, a starter sound is selected from the sound library 264 and is played when an action similar to an action in the action database 262 is observed. The starter sound from the sound library 264 that is played, is associated with the action in the action database 262, and is played prior to the actual sound, generated by the action, arrives at a user's location and is stopped when the actual sound arrives. In this illustrative example, computer system 200 includes components that can be implemented in hardware such as the hardware shown in network data processing system 100 in FIG. 1.

Computer system 200 comprises information processing unit 216, machine intelligence 218, and indexing program 230. Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for determining a starter sound, associated with an action type, and for playing the starter sound, when an action occurs, matching the action type.

In an embodiment, processing unit 216 comprises one or more conventional general purpose central processing units (CPUs). In an alternate embodiment, processing unit 216 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second then a conventional general purpose CPU, on the order of 1000× more. GPUs can be clustered together to run neural networks comprising hundreds of millions of connection nodes.

Indexing program 230 comprises information gathering 252, selecting 232, modeling 234, comparing 236, indexing 238, ranking 240, and displaying 242. Information gathering 252 comprises internal 254. Internal 254 is configured to gather data from internal databases 260.

Thus, processing unit 216, machine intelligence 218, and indexing program 230 transform a computer system into a special purpose computer system as compared to currently available general computer systems that do not have a means to perform machine learning predictive modeling such as computer system 200 of FIG. 2. Currently used general computer systems do not have a means to determine a starter sound associated with an action and to play the starter sound when the action occurs, where the starter sound is played before the actual sound from the action is received by the user.

The processing unit 216, the machine intelligence 218, and the indexing program 230 use sounds and images gathered by devices 270 to determine action types and starter sounds associated with action types. The starter sounds are stored in the sound library 264 and are played when the computer system 200 determines that an action has occurred that matches or is similar to one of the action types stored in action database 262. The starter sound is played before the actual sound produced by the action arrives at the user's location and stops playing at the time the actual sound produced by the action arrives at the user's location.

Computer system 200 may be implemented in software, hardware, firmware or a combination thereof. When software is used, the operations performed by computer system 200 may be implemented in program code configured to run on hardware, such as a processor unit. When firmware is used, the operations performed by computer system 200 may be implemented in program code and data and stored in persistent memory to run on a processor unit. When hardware is employed, the hardware may include circuits that operate to perform the operations in computer system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In an embodiment, computer system 200 is a physical hardware system and includes one or more data processing systems. When more than one data processing system is present in computer system computer system 200, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with a user not satisfactorily experiencing an event. As a result, one or more technical solutions may provide a technical effect of producing a starter sound when a distant action is observed to have occurred, the starter sound played before the actual sound from the action arrives at the user's location and the starter sound causing an aural response in the user that causes the user to perceive the actual sound and the light from the action as having arrived simultaneously.

As a result, computer system 200 operates as a special purpose computer system in which machine intelligence component 218 in computer system 200 enables determination of a starter sound associated with an action. Machine intelligence component 218 also enables recognizing when a similar action occurs and playing a starter sound, associated with the action before the actual sound from the action reaches a listener. In particular, machine intelligence component 218 transforms computer system 200 into a special purpose computer system as compared to currently available general computer systems that do not have machine intelligence component 218.

Computer system 200 performs a transformation of data from image and sound data into determinations of starter sounds associated with an action which produced the image and sound date. Thus, computer system 200 changes the data such that the data has a different function or has a different use.

The illustration of computer system 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
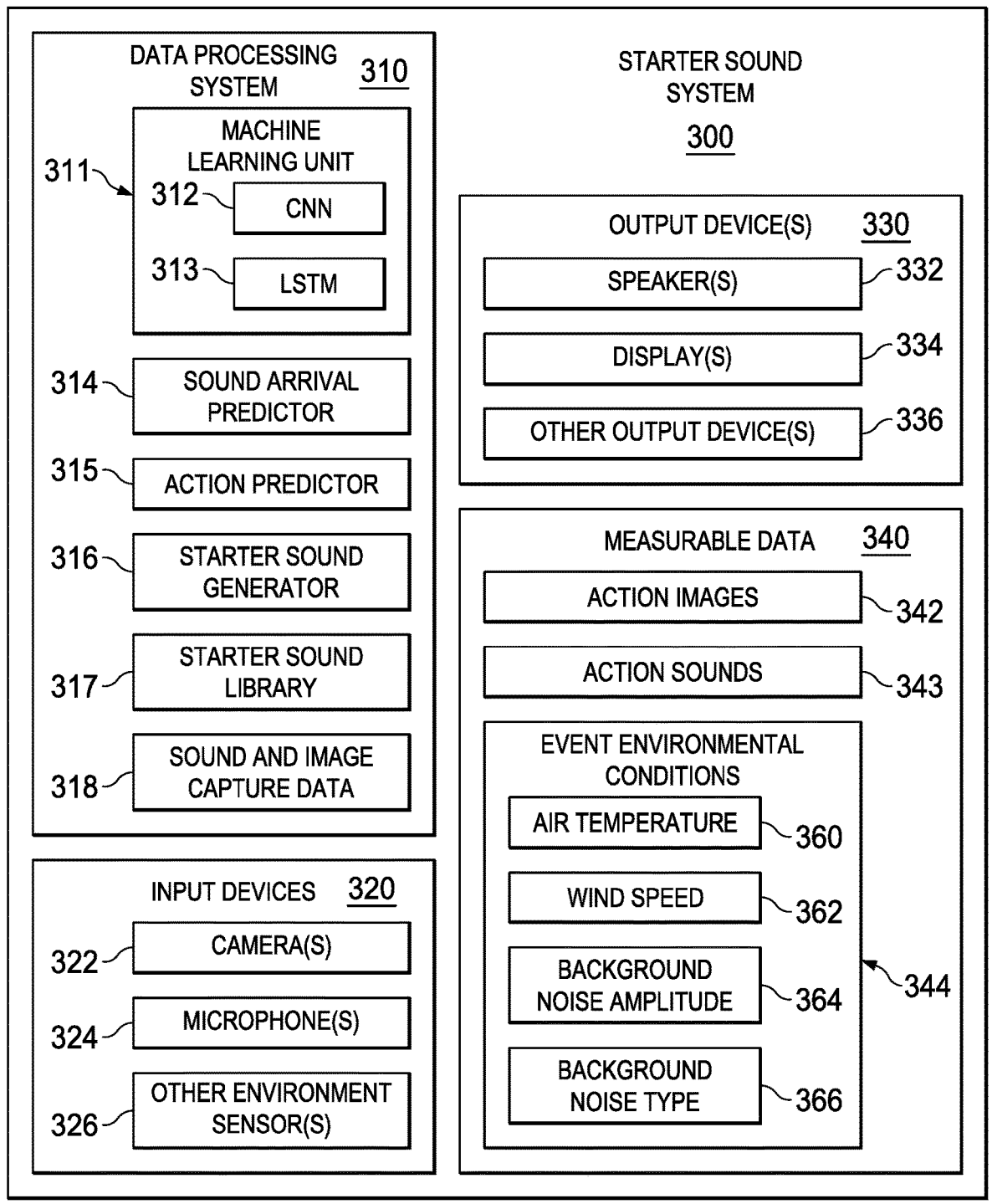
FIG. 3 is an illustrative embodiment of a starter sound system.

FIG. 3 is an illustrative embodiment of a starter sound system 300. System 300 includes data processing system 310, input devices 320, output devices 330, and measurable data 340. Data processing system 310 includes a machine learning unit 311, a sound arrival predictor 314, an action predictor 315, a starter sound generator 316, and a starter sound library 317, and sound and image capture data 318. The machine learning unit 311 includes a convolutional neural network 312 and a Long Short Term Memory (LSTM) 313. Input devices 320 includes one or more cameras 322, one or more microphones 324, and other environmental sensor(s) 326. Other environment sensor(s) 324 may include other input devices not shown, such as, for example, thermometers or other temperature measuring devices, wind speed indicators, and barometric pressure indicators, humidity indicators, and other similar environmental condition measuring devices. Output devices 330 include one or more speakers 332, one or more displays 334, and may include other output devices 336.

Camera(s) 322 records action images 342. The action images 342 are collected as a series of raster images, such as for example, images in a Joint Photographic Experts Group (JPEG) format, taken as a sequence. Microphone(s) 324 record sound created by the action. In an embodiment, camera(s) 322 and/or microphone(s) 324 are moveable. If the camera(s) 322 and microphone(s) 324 are not co-located, the location of the action may be determined by triangulation.

The input devices 320 capture measurable data 340. The measurable data include action images 342, action sounds 343 and event environmental conditions 344. The event environmental conditions may include air temperature 360, wind speed 362, background noise amplitude 364, and background noise type 366. In an embodiment, event environmental conditions 344 may include other data than those listed above. Images and sound data captured by camera(s) 322 and microphone(s) 324 may be stored in sound and image capture date 318 for later use by the machine learning unit 311 in identifying actions and corresponding starter sounds.

The machine learning unit 311 determines starter sounds and phase shifts for various actions. An action can be any type of event, such as, for example, a golfer hitting a golf ball, a hitter in baseball hitting a baseball, a firework exploding, etc. The machine learning unit(s) 311 receives images of an action and sounds associated with the action from camera(s) 322 and microphones 324. The images are a series of raster images taken as sequence (e.g., video images). The machine learning unit 311 converts the sounds into a spectrogram at each of the images. Thus, each of the series of images has a corresponding spectrogram constructed based on the sound at the time corresponding to when the image was acquired. In an embodiment, the images from the video are in three channels (red, green, and blue) while the spectrogram is also within three channels (red, green, and blue or grayscale). The machine learning units 311 concatenates each of the raster images with a corresponding spectrogram. The concatenated images are fed through CNN 312. The deep connected portion of the neural network is input into LSTM 313. The CNN 312 correlates the feature discovery process between sound and light while the LSTM 313 finds patterns across time samples. The output from the CNN 312 and LSTM 313 is a phase shift (which accounts for action movement) and a starter sound play "speed up". The output of the CNN's 312 feature vector is saved within starter sound library 317. Starter sound library 317 may be a relational database (DB) and stores starter sounds and the actions to which each starter sound corresponds.

After the starter sounds are determined and stored in starter sound library 317, the data processing system 310 may monitor an event for various actions. The data processing system 310 receives image inputs from the camera(s) 322 and action predictor 315 analyzes the image inputs to determine if an action, for which a starter sound has been stored, is about to occur. The action predictor 315 may be trained by the machine learning unit 311 to recognize various events and recognize whether an event is similar to one stored in the starter sound library 317. If action predictor 315 predicts that an action is about to occur, the starter sound corresponding to a similar action is retrieved from the starter sound library 317. Starter sound generator 316 dampens and smooths the retrieved starter sound with convolution and generates the adjusted starter sound. The starter sound generator 316 may utilize event environmental conditions data 344 to further adjust the starter sound such that the adjusted starter sound blends into the listener's environment as being natural rather than artificial and is sufficiently loud to be audible over the background noise. The adjusted starter sound is played through one or more speaker(s) 332 that are located nearer an audience member than is the location of the action. When a listener hears the starter sound, it is perceived as being from the action and causes neural responses within the listener preparing them to receive the actual sound such that the listener perceives the image of the action and the sound from the action as having arrived simultaneously or near simultaneously. The sound arrival predictor 314 predicts when sound from a predicted action will arrive at the location of the listener. The adjusted starter sound is generated and played through speaker(s) 332 such that the adjusted starter sound ends at the time the actual sound arrives at the listener's location.

In some embodiments, the listener is a user watching an event on television, a mobile device, or some other electronic means. The images and sounds of the event, presented to these users, is a latent event rather than a live event, but the starter sound may be used for these types of events as well. In these embodiments, the microphone utilized by, for example, a broadcasting company, to capture the sound of an event is used as the location of the listener and the calculations for the adjusted starter sound and timing of playing the adjusted starter sound are based on this location. Once determined, the adjusted starter sound is broadcast with the event as if it is part of the original sound and is played through the speaker 332 of the user's device, such as a television or mobile phone. The images captured by the camera are also presented to the user on display(s) 334. The use of a starter sound for these latent events causes the user of the television or mobile device to perceive the sound as having arrived at the same time as the image from their screen, just as it does for audience members at a live event.

In some embodiments, the output device(s) 330 may include other output device(s) 336 such as a wind generator, a fragrance machine, a water vapor mister, or other similar types of devices that enhance the audience member's experience by engaging other senses in addition to sight and hearing. For example, if an action is also associated with a certain fragrance, the data processing system 310 may cause a chemical fragrance to be emitted near the audience member.

Figure 4:
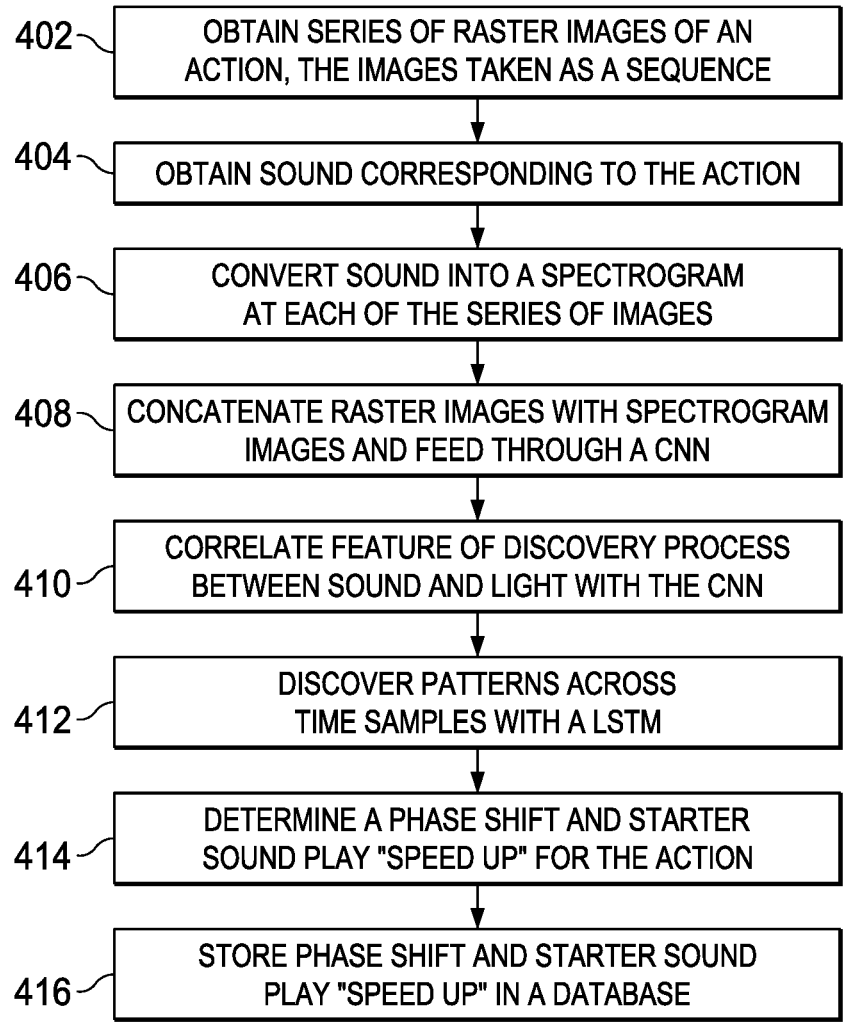
FIG. 4 is an illustration of a flowchart of a process for calculating factors used in determining and playing a starter sound in accordance with an illustrative embodiment.

Turning to FIG. 4, an illustration of a flowchart of a process for calculating factors used in determining and playing a starter sound is depicted in accordance with an illustrative embodiment. This process can be implemented in software, hardware, or a combination of the two. When software is used, the software comprises program code that can be loaded from a storage device and run by a processor unit in a computer system such as computer system 200 in FIG. 2 and a processing unit such as processing unit 216 in FIG. 2. Moreover, the process can be implemented by data processing system 310 in FIG. 3. Computer system 200 and/or data processing system 310 may reside in a network data processing system such as network data processing system 100 in FIG. 1. For example, computer system 200 and/or data processing system 310 may reside on one or more of server computer 104, server computer 106, and client computer 110 connected by network 102 in FIG. 1.

The process begins by obtaining a series of raster images of an action (step 402). The images are taken as a sequence. Next, the process obtains sound corresponding to the action (step 404). Next, the sound is converted into a spectrogram at each of the series of images (step 406). Next, the raster images and spectrogram images are concatenated and fed through a CNN (step 408). Next, features of a discovery process between the sound and light are correlated with the CNN (step 410). Next, a LSTM discovers patterns across time samples (step 412). Next, a phase shift and starter sound play "speed up" for the action are determined according to the correlations and patterns determined by the CNN and the LSTM (step 414). Next, the phase shift and starter sound play "speed up" are stored in a database or sound library and associated with an action type (step 416).

Figure 5:
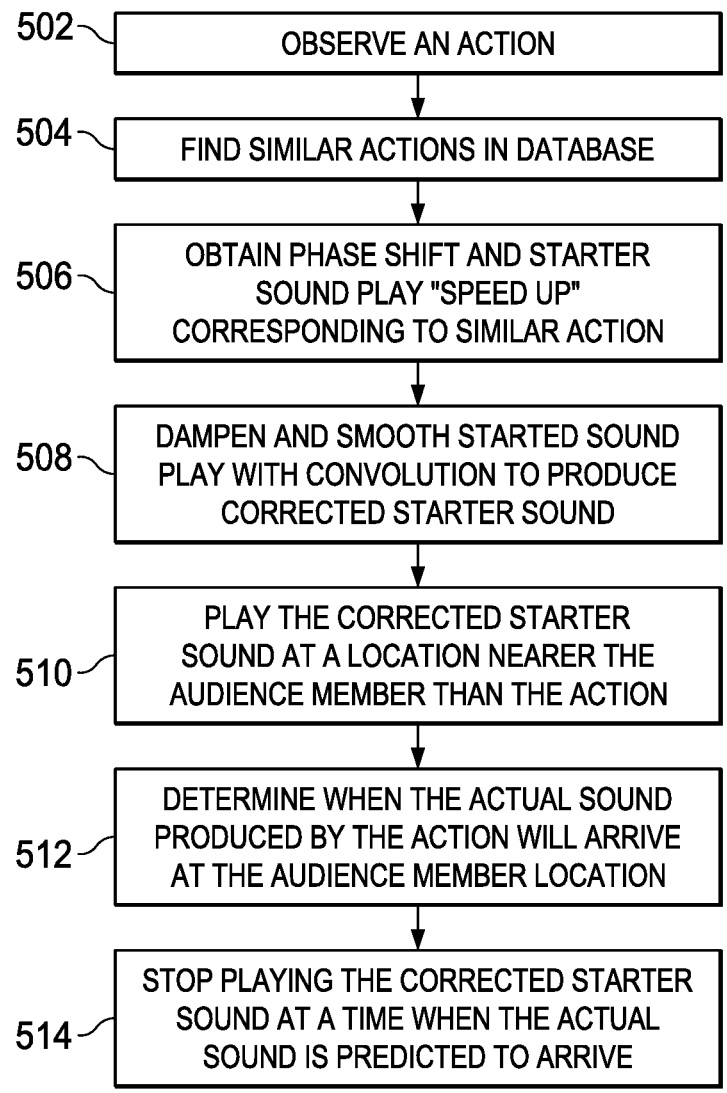
FIG. 5 is an illustration of a flowchart of a process for playing a starter sound in accordance with an illustrative embodiment.

Turning to FIG. 5, an illustration of a flowchart of a process for playing a starter sound is depicted in accordance with an illustrative embodiment. This process can be implemented in software, hardware, or a combination of the two. When software is used, the software comprises program code that can be loaded from a storage device and run by a processor unit in a computer system such as computer system 200 in FIG. 2 and a processing unit such as processing unit 216 in FIG. 2. Moreover, the process can be implemented by data processing system 310 in FIG. 3. Computer system 200 and/or processing unit 216 may reside in a network data processing system such as network data processing system 100 in FIG. 1. For example, computer system 200 and/or data processing system 310 may reside on one or more of server computer 104, server computer 106, and client computer 110 connected by network 102 in FIG. 1.

The process begins by observing an action (step 502). Observing an action may include monitoring and observing various scenes and determining whether a scene contains events that will lead to an action for which a starter sound for a similar action has been stored. Next, a similar action is found in the database (step 504). Next, a phase shift and starter sound play "speed up" corresponding to the similar action are obtained from the database (step 506). Next, the starter sound play is dampened and smoothed with convolution to produce a corrected starter sound (step 508). Next, the corrected starter sound is played at a location nearer the audience member than the action (step 510). Next, the time when the actual sound produced by the action will arrive at the audience member's location is determined (step 512). Next, the corrected starter sound is stopped when the actual sound is predicted to arrive at the audience member's location (step 514).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
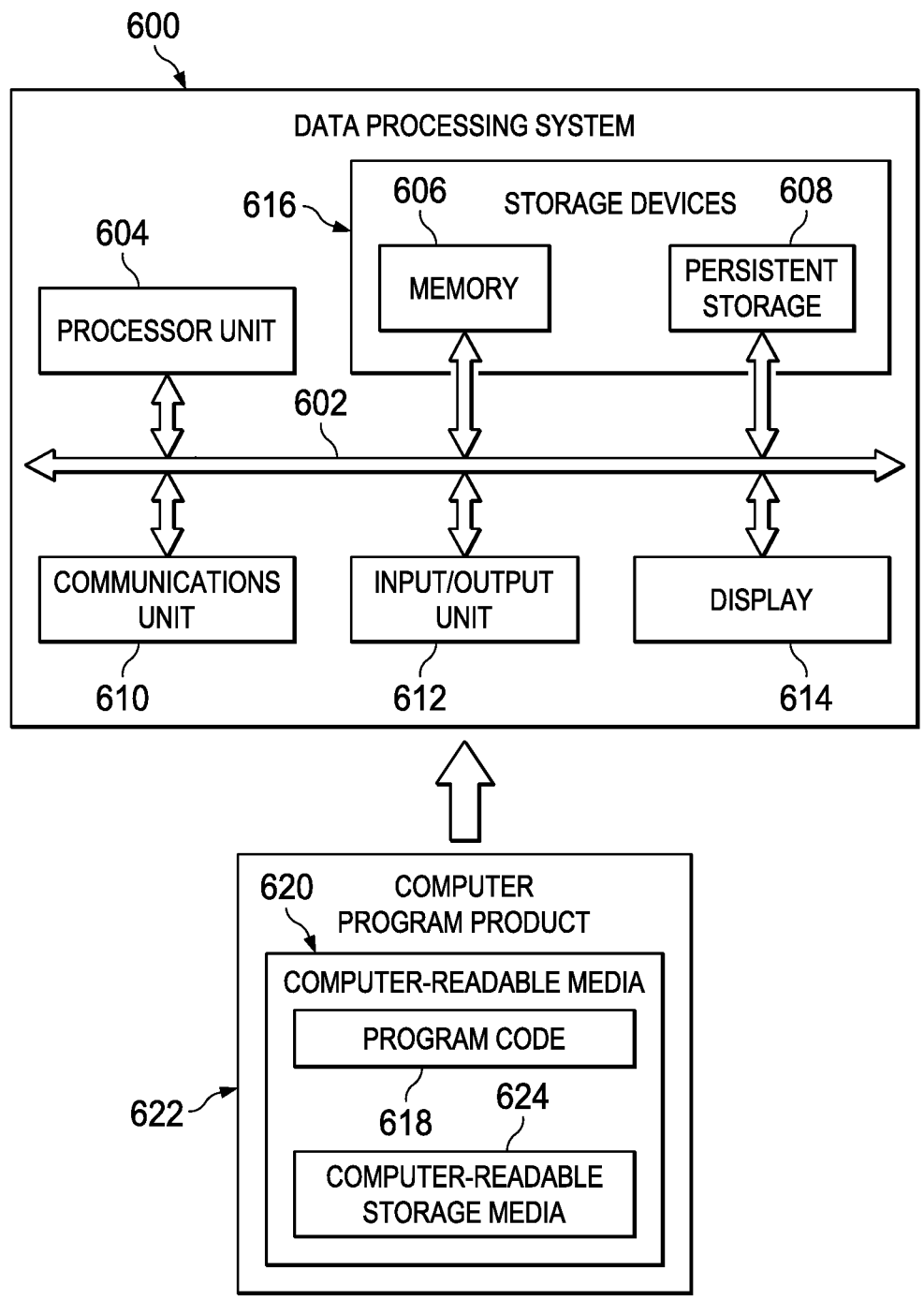
FIG. 6 is a block diagram of a data processing system in accordance with an illustrative embodiment.

Turning now to FIG. 6, a block diagram of a data processing system is depicted in accordance with an illustrative embodiment. Data processing system 600 may be used to implement server computer 104, server computer 106, client devices 110, computer system 200, and starter sound system 300. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid-state drive (SSD), a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 may be transferred to data processing system 600 using a computer-readable signal media. The computer-readable signal media may be, for example, a propagated data signal containing program code 618. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, illustrative embodiments of the present invention provide a computer implemented method, computer system, and computer program product for determining a starter sound associated with various actions and playing the starter sound prior to arrival of the actual sound such that an audience member perceives the light and sound from an action as having arrived as the same time. As a result, system 200, 300, or 600 operate as a special purpose computer system in which, for example, components 311-318 allow system 300 to enhance an audience member's experience of an event through determination and presentation of a starter sound associated with an action. In particular, components 311-318 transforms computer system 300 into a special purpose computer system as compared to currently available general computer systems that do not have these components.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for reducing a listener's perceived gap between reception of an action image produced by an action at a distance from a listener and an action sound produced by the action, the method comprising:
predicting when a distant action will occur to produce a predicted action time, wherein the predicting comprises analyzing images of a scene leading up to the action occurring; and
generating a starter sound from a sound generation location near the listener, the starter sound generated according to the predicted action time and according to the distant action, the starter sound generated at a time such that the starter sound arrives at a listener's location at or after the action image arrives at the listener's location, the starter sound generated at the time such that the starter sound arrives at the listener's location prior to arrival of the action sound produced by the action, and the starter sound designed such that the listener perceives the action sound as having arrived at a same time as the arrival of the action image.

2. The method of claim 1, wherein the generating the starter sound comprises:
obtaining a series of raster images of an action;
obtaining sound corresponding to the action;
converting the sound into a spectrogram image for each of the series of raster images resulting in a plurality of spectrogram images; and
determining a phase shift and a starter sound for the action according to the spectrogram images and the raster images; and storing the phase shift and the starter sound in a library of starter sounds as a stored starter sound.

3. The method of claim 2, wherein the generating the starter sound further comprises:
concatenating the raster images with the spectrogram images to produce concatenated images;
feeding the concatenated images through a convolution neural network (CNN) to correlate features between the sound and the raster images; and
discovering patterns across time samples with Long Short Term Memory (LSTM).

4. The method of claim 3, wherein the generating the starter sound further comprises:
dampening and smoothing a stored starter sound with convolution to produce an adjusted starter sound.

5. The method of claim 1, wherein the generating the starter sound comprises:
obtaining a stored starter sound and a stored phase shift from a sound library, the stored starter sound corresponding to a stored type of action that is similar to the distant action.

6. The method of claim 1, wherein the starter sound is produced from a speaker located nearer to the listener than an actual location of the action.

7. The method of claim 1, wherein the starter sound is determined according to the distant action.

8. The method of claim 1, wherein the time is determined according to at least one of a distance between a location of the action and the listener's location, a distance between the location of the sound generation location and the listener's location, environmental conditions proximate to the location of the action, and environmental conditions proximate to the listener's location.

9. The method of claim 8, wherein the environmental conditions comprise at least one of air temperature, wind speed, background noise level, and background noise type.

10. A starter sound system for synchronizing an action sound with an action image, comprising:
a computer system;
one or more processors running on the computer system, wherein the one or more processors predict when a distant action will occur to produce a predicted action time by analyzing images of a scene leading up to the action occurring; and generate a starter sound from a sound generation location near a listener, the starter sound generated according to the predicted action time and according to the distant action, the starter sound generated at a time such that the starter sound arrives at a listener's location at or after the action image arrives at the listener's location, the starter sound generated at the time such that the starter sound arrives at the listener's location prior to arrival of the action sound produced by the action, and the starter sound designed such that the listener perceives the action sound as having arrived at a same time as the arrival of the action image.

11. The starter sound system of claim 10, wherein the one or more processors further:
obtain a series of raster images of an action;
obtain sound corresponding to the action;
convert the sound into a spectrogram image for each of the series of raster images resulting in a plurality of spectrogram images;
determine a phase shift and a starter sound for the action according to the spectrogram images and the raster images; and
store the phase shift and the starter sound in a library of starter sounds as a stored starter sound.

12. The starter sound system of claim 11, wherein the one or more processors further:
concatenate the raster images with the spectrogram images to produce concatenated images;
feed the concatenated images through a convolution neural network (CNN) to correlate features between the sound and the raster images; and
discover patterns across time samples with Long Short Term Memory (LSTM).

13. The starter sound system of claim 12, wherein the one or more processors further:
dampen and smooth a stored starter sound with convolution to produce an adjusted starter sound.

14. The starter sound system of claim 10, wherein the one or more processors further:
obtain a stored starter sound and a stored phase shift from a sound library, the stored starter sound corresponding to a stored type of action that is similar to the distant action.

15. A computer program product for generating a starter sound for reducing a listener's perceived gap between reception of an action image produced by an action at a distance from a listener and an action sound produced by the action, the computer program product comprising:
a non-transitory computer-readable storage media;
a first program code, stored on the non-transitory computer-readable storage media, for predicting when a distant action will occur to produce a predicted action time, wherein the predicting comprises analyzing images of a scene leading up to the action occurring; and
a second program code, stored on the non-transitory computer-readable storage media, for generating a starter sound from a sound generation location near the listener, the starter sound generated according to the predicted action time and according to the distant action, the starter sound generated at a time such that the starter sound arrives at a listener's location at or after the action image arrives at the listener's location, the starter sound generated at the time such that the starter sound arrives at the listener's location prior to arrival of the action sound produced by the action, and the starter sound designed such that the listener perceives the action sound as having arrived at a same time as the arrival of the action image.

16. The computer program product of claim 15, further comprising:
third program code for obtaining a series of raster images of an action;
fourth program code for obtaining sound corresponding to the action;
fifth program code for converting the sound into a spectrogram image for each of the series of raster images resulting in a plurality of spectrogram images; and
sixth program code for determining a phase shift and starter sound for the action according to the spectrogram images and the raster images; and
seventh program code for storing the phase shift and the starter sound in a library of starter sounds as a stored starter sound.

17. The computer program product of claim 16, further comprising:
eighth program code for concatenating the raster images with the spectrogram images to produce concatenated images;

ninth program code for feeding the concatenated images through a convolution neural network (CNN) to correlate features between the sound and the raster images; and tenth program code for discovering patterns across time samples with Long Short Term Memory (LSTM).

18. The computer program product of claim 17, further comprising:

eleventh program code for dampening and smoothing a stored starter sound with convolution to produce an adjusted starter sound.

19. The computer program product of claim 15, further comprising:

third program code for obtaining a stored starter sound and a stored phase shift from a sound library, the stored starter sound corresponding to a stored type of action that is similar to the distant action.

20. The computer program product of claim 15, wherein the starter sound is determined according to the distant action.

* * * * *